US011518489B2

(12) United States Patent
Zhang et al.

(10) Patent No.: US 11,518,489 B2
(45) Date of Patent: *Dec. 6, 2022

(54) SYSTEMS AND METHODS FOR AN ORIGAMI-INSPIRED FOLDABLE QUAD-ROTOR

(71) Applicants: Wenlong Zhang, Tempe, AZ (US); Dangli Yang, Tempe, AZ (US); Shatadal Mishra, Tempe, AZ (US); Daniel Aukes, Tempe, AZ (US)

(72) Inventors: Wenlong Zhang, Tempe, AZ (US); Dangli Yang, Tempe, AZ (US); Shatadal Mishra, Tempe, AZ (US); Daniel Aukes, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 357 days.

This patent is subject to a terminal disclaimer.

(21) Appl. No.: 16/830,993

(22) Filed: Mar. 26, 2020

(65) Prior Publication Data
US 2020/0307755 A1    Oct. 1, 2020

Related U.S. Application Data

(60) Provisional application No. 62/823,937, filed on Mar. 26, 2019.

(51) Int. Cl.
*B64C 1/06*      (2006.01)
*B64C 39/02*     (2006.01)
*B64C 1/30*      (2006.01)

(52) U.S. Cl.
CPC .......... *B64C 1/063* (2013.01); *B64C 39/024* (2013.01); *B64C 1/30* (2013.01); *B64C 2201/108* (2013.01)

(58) Field of Classification Search
CPC .......... B64C 39/024; B64C 1/063; B64C 1/30
See application file for complete search history.

(56) References Cited

U.S. PATENT DOCUMENTS 4,090,684 A * 5/1978 Look .......................... B64C 3/56
                                                        244/49
6,008,447 A * 12/1999 Meurer ................... B64G 1/443
                                                        244/172.6

(Continued)

FOREIGN PATENT DOCUMENTS

CN    106114815 A  * 11/2016  ............... B64C 1/30
CN    208233331 U  * 12/2018

OTHER PUBLICATIONS

Birkmeyer, et al., DASH: A dynamic 16g hexapedal robot, 2009 IEEE/RS.1 International Conference on Intelligent Robots and Systems, pp. 2683-2689. Oct. 2009.

(Continued)

*Primary Examiner* — Christopher D Hutchens
(74) *Attorney, Agent, or Firm* — Polsinelli PC (57) ABSTRACT

Various embodiments for a foldable quad-rotor (FQR) inspired by an origami mechanism are disclosed herein. The FQR can fold its arms during flight to enable aggressive turning maneuvers and operations in cluttered environments. A dynamic model of folding is built for this system with the collected data, and a feedback controller is designed to control the position and orientation of the FQR. Lyapunov stability analysis is conducted to show that the system is stable during arm folding and extension, and motion planning of the FQR is achieved based on a modified minimum-snap trajectory generation method.

20 Claims, 11 Drawing Sheets

(56) References Cited

U.S. PATENT DOCUMENTS

| | | | | |
|---|---|---|---|---|
| 10,676,177 | B1* | 6/2020 | Costello | B64C 25/001 |
| 11,260,972 | B2* | 3/2022 | Zhang | B32B 21/02 |
| 2019/0100296 | A1* | 4/2019 | Aldana | G05D 1/042 |
| 2019/0143517 | A1 | 5/2019 | Yang et al. | |
| 2019/0225335 | A1 | 7/2019 | Zhang et al. | |
| 2020/0102043 | A1 | 4/2020 | Zhang et al. | |
| 2020/0130803 | A1* | 4/2020 | Xiao | B64C 1/063 |
| 2020/0361095 | A1 | 11/2020 | Nguyen et al. | |

OTHER PUBLICATIONS

Delimont, et al., Evaluating compliant hinge geometries for origami-inspired mechanisms, Journal of Mechanisms and Robotics, vol. 7, No. 1, p. 011009, 2015.

Fernando, et al., Robust adaptive geometric tracking controls on so (3) with an application to the attitude dynamics of a quadrotor uav, Decision and Control and European Control Conference (CDC-ECC), 2011 50th IEEE Conference on. IEEE, 2011, pp. 7380-7385.

Goldberg, et al., Gait studies for a quadrupedal microrobot reveal contrasting running templates in two frequency regimes, Bioinspiration & Biomhnetics, vol. 12, No. Jan. 2017.

Haldane, et al., Animal-inspired design and aerodynamic stabilization of a hexapedal millirobot, 2013 IEEE International Conference on Robotics and Automation, pp. 3279-3286, May 2013.

Henderson, et al., Towards bio-inspired structural design of a 3d printable, ballistically deployable, multi-rotor 1121V, Aerospace Conference, 2017 IEEE. IEEE, 2017. pp. 1-7.

Hintz, et al., Design and dynamic modeling of a rotary wing aircraft with morphing capabilities, Unmanned Aircraft Systems (ICUAS), 2014 International Conference on. IEEE, 2014, pp. 492-498.

Holda, et al., Tilting multicopter rotors for increased power efficiency and yaw authority, 2018 International Conference on Unmanned Aircraft Systems (ICUAS). IEEE, 2018, pp. 143-148.

Kim, et al., An origami-inspired, self-locking robotic arm that can be folded flat, Science Robotics, vol. 3, No. 16, p. eaar2915, 2018.

Koh, et al., A Modular Folded Laminate Robot Capable of Multi Modal Locomotion, ISER 2016, vol. 1, pp. 1-12, 2017.

Kornatowski, et al., An origami-inspired cargo drone, IEEE/RSJ International Conference on Intelligent Robots and Systems, No. EPFL-CONF-230988. 2017.

Lee, et al., Geometric tracking control of a quadrotor uav on se (3), Decision and Control (CDC), 2010 49th IEEE Conference on. IEEE, 2010, pp. 5420-5425.

Liu, et al., Transition control of tilt rotor unmanned aerial vehicle based on multi-model adaptive method, Unmanned Aircraft Systems (ICUAS), 2017 International Conference on. IEEE, 2017, pp. 560-566.

Ma, et al., Controlled Flight of a Biologically Inspired, Insect-Scale Robot, Science, vol. 340, No. 6132, pp. 603-607, May 2013.

Mellinger, et al., Minimum snap trajectory generation and control for quadrotors, Robotics and Automation (ICRA), 2011 IEEE International Conference on. IEEE, 2011, pp. 2520-2525.

Mellinger, Trajectory generation and control, for quadrotors. University of Pennsylvania, 2012.

Mintchev, et al., A multi-modal hovering and terrestrial robot with adaptive morphology, Proceedings of the 2nd International Symposium on Aerial Robotics, No. CONF, 2018.

Mulgaonkar, et al., The flying monkey: A mesoscale robot that can run, fly, and grasp, 2016 IEEE International Conference on Robotics and Automation (ICRA). IEEE, May 2016, pp. 4672-4679.

Pounds, et al., Stability of small-scale uav helicopters and quadrotors with added payload mass under pid control, Autonomous Robots, vol. 33, No. 1-2, pp. 129-142, 2012.

Riviere, et al., Agile robotic fliers: A morphing-based approach, Soft robotics, 2018.

Sreetharan, et al., Monolithic fabrication of millimeter-scale machines, Journal of Micromechanics and Microengineering, vol. 22, No. 5, p. 055027, May 2012.

Vander Hoff, et al., Origamibot-i: A thread-actuated origami robot for manipulation and locomotion, Intelligent Robots and Systems (IROS 2014), 2014 IEEE/RSJ International Conference on. IEEE, 2014, pp. 1421-1426.

Whitney, et al., Pop-up book MEMS, Journal of Micromechanics and Microengineering, vol. 21, No. 11, p. 115021, Nov. 2011.

Zhao, et al., The deformable quad-rotor: Design, kinematics and dynamics characterization, and flight performance validation, Intelligent Robots and Systems (IRO,S), 2017 IEEE/RS.1 International Conference on. IEEE. 2017, pp. 2391-2396.

* cited by examiner

SYSTEMS AND METHODS FOR AN ORIGAMI-INSPIRED FOLDABLE QUAD-ROTOR

CROSS REFERENCE TO RELATED APPLICATIONS

This is a non-provisional application that claims benefit to U.S. provisional application Ser. No. 62/823,937 filed on Mar. 26, 2019, which is herein incorporated by reference in its entirety.

FIELD

The present disclosure generally relates to portable unmanned aerial vehicles, and in particular, to systems and methods for design, planning, and control of origami-inspired foldable quad-rotors.

BACKGROUND

Quad-rotors have previously been studied as a low-cost unmanned aerial vehicle (UAV) platform with a wide variety of applications including mapping, agriculture, surveillance, and search and rescue. However, since quad-rotor models are nonlinear and underactuated, they pose significant technical challenges including autonomous motion planning and control. Traditional quad-rotors mount motors and electronics on a rigid structure, with various nonlinear control approaches having been developed based on this rigid-body model. Although a rigid structure can simplify the fabrication and modeling of quad-rotors, oftentimes the underactuated structure of these quad-rotors makes it challenging to plan motions and achieve fast maneuvers, especially in complex environments with multiple obstacles.

It is with these observations in mind, among others, that various aspects of the present disclosure were conceived and developed.

Corresponding reference characters indicate corresponding elements among the view of the drawings. The headings used in the figures do not limit the scope of the claims.

DETAILED DESCRIPTION

Various embodiments of a system and associated method for a foldable quad-rotor (FQR) drone are described herein. In some embodiments, the foldable quad-rotor includes a central body in operative association with a plurality of foldable arms, with each foldable arm having a distal end. In some embodiments, each of the foldable arms includes a rotor and an associated propeller located at the respective distal end. In one aspect, each of the plurality of foldable arms includes a support member in association with a plurality of bendable strips each including a tensioned bendable portion. In some embodiments, the system includes a plurality of threads with each of the plurality of threads having a respective proximal portion terminating at the center body and a respective distal portion terminating at the distal end of each of the plurality of arms. The center body is configured for tensioning or slacking each of the plurality of threads such that the distal end of each of the plurality of foldable arms is drawn inward towards the central body by the thread or drawn away from the central body by the plurality of tensioned bendable strips, thereby allowing a change in length of each of the plurality of arms during flight for improved handling and control of the system. Referring to the drawings, embodiments of the foldable quad-rotor (FQR) drone, herein referred to as "the system" or the "FQR", are illustrated and generally indicated as 100 in FIGS. 1-11.

The present disclosure includes an inventive concept for directly addressing the significant technical challenges related to autonomous motion planning and control of quad-rotors. In particular, the inventive concept includes an addition of one more degrees of freedom to a quad-rotor using an origami-inspired folding mechanism 110. Origami-inspired, folding, and laminate devices may be used in a variety of robotic applications, from flapping-wing flying robots at the millimeter scale to terrestrial robots at the millimeter and centimeter scales. These robots may utilize a multilayer manufacturing approach to facilitate the creation of flexure-based hinges which can be modeled as revolute joints. Structural elements can be erected like a "pop-up" book into a three-dimensional shape and fixed, with some degrees of freedom remaining as mechanisms and transmissions used to transmit power from actuators to the ground or air. These techniques may be used in a walking/flying quad-rotor design which permits a small UAV to alternate between walking and flying while grasping small objects. While some conventional foldable robots utilize laminate and foldable strategies for transmitting power through linkages, most of these concepts have not looked at how these fabrication techniques can be used to reconfigure the structures of more traditional robots and quad-rotors to enhance performance and stability.

The present inventive concept utilizes a laminate origami structure for in-flight morphing. The main features of the inventive concept include:

A foldable quad-rotor (FQR) 100 (FIG. 1) is a laminate structure inspired by "origami" folding techniques and having a dynamic foldable mechanism 110 (FIG. 3) which can fold or unfold while in flight. The FQR 100 may be made of laser-cut cardboard or fiberglass which significantly reduces cost and shortens fabrication time when compared with additive or machining methods of manufacture.

A dynamic model of the folding mechanism 110 is developed related to the FQR 100 structure, and a feedback controller module executed by a processor 190 in communication with a controller 129 is designed with a Lyapunov stability approach to guarantee stability during in-flight arm folding and extension.

Figure 1:
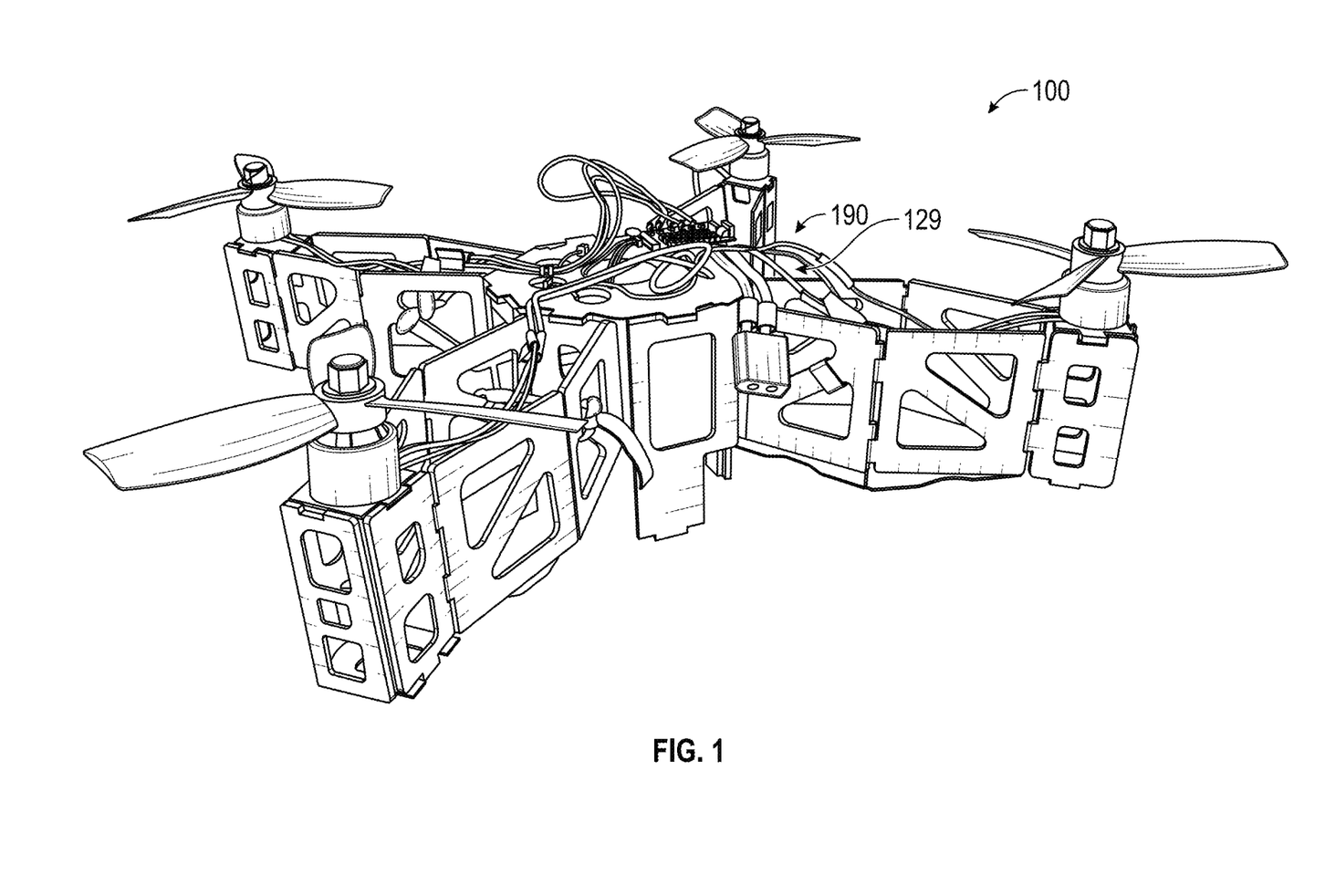
FIG. 1 is a photograph showing a perspective view of one embodiment of a foldable quad-rotor drone (FQR)

A minimum-snap trajectory generation technique is extended to plan for the folding actions and to be executed by the processor 190 in communication with a controller 129, as shown in FIG. 1. Simulation results demonstrate the difference of trajectories when the FQR 100 and a conventional quad-rotor fly through obstacles.

The remainder of this disclosure is organized as follows. First, the details of the design, fabrication, and aerodynamic analysis of the FQR 100 are presented. Then, dynamic models of the folding mechanism and the entire FQR 100 are developed based on physical laws and experimental data. The disclosure further discusses the feedback controller design of trusts and moments, and stability analysis is conducted. Then, the simulation results on both high-level motion planning and low-level motion control are presented.

Design of the FQR Structure
Origami and Thread-Actuated Mechanism Design

An origami-inspired folding mechanism 110 onboard the system 100 uses a laminate structure to create hinges, springs, or other traditional mechanical components. The principle is to transform traditional mechanical components into a laminate form. The benefits of this process include saving space, reducing weight, and accelerating the manufacturing process. However, since the connections between different layers are usually through heat adhesive, and the layer materials are usually thin layer of cardboard polymer or fiberglass, the force and moment that the origami structure (especially the hinges) can undertake before large displacement or structural damage happen are very limited. In design embodiments of the FQR 100, the hinges of each arm may function as springs with changing spring constants because their stiffness and duration will be influenced by fatigue.

Figure 2:
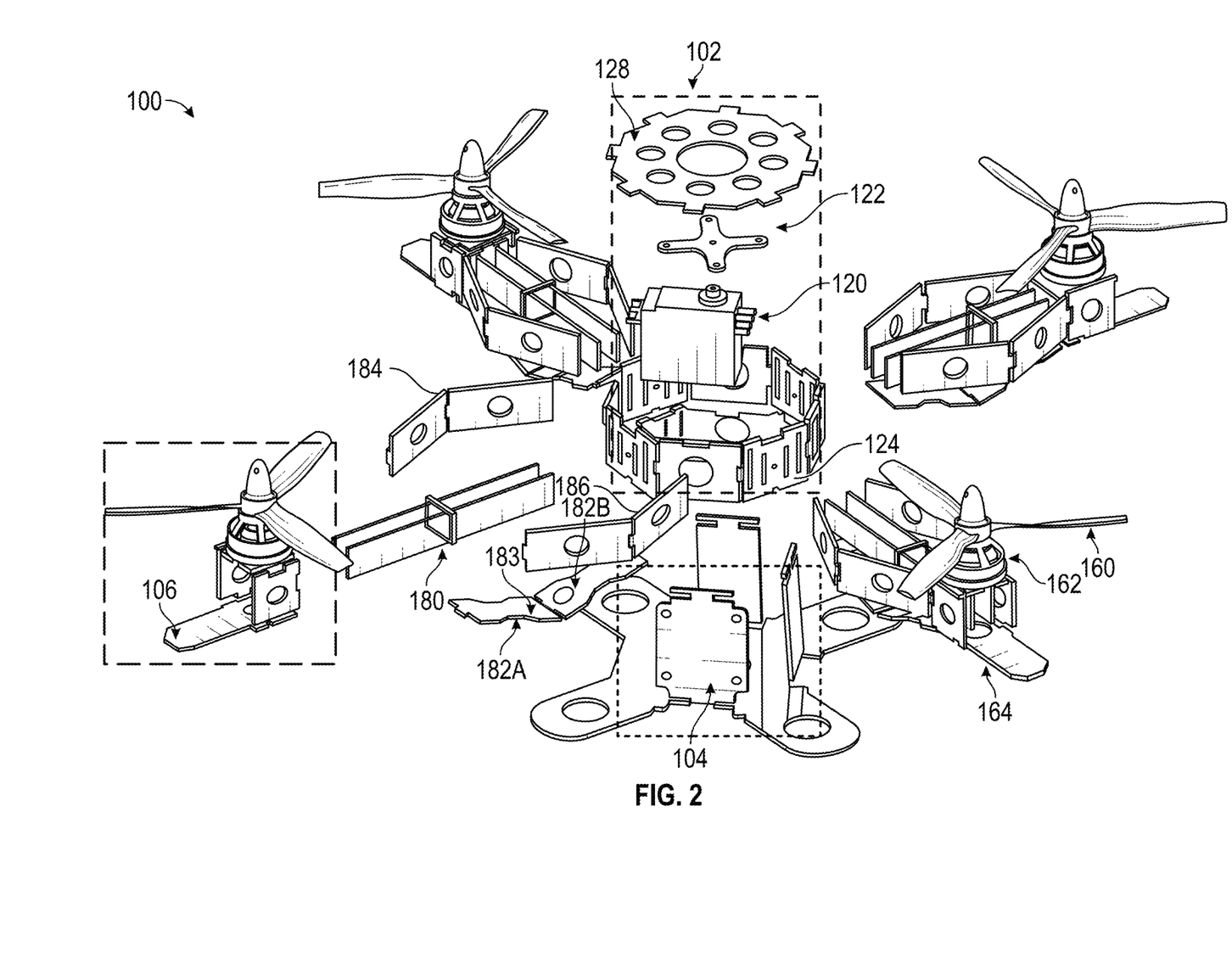
FIG. 2 is a partially exploded view of an FQR structure of FIG. 1.

An embodiment of the FQR 100 is shown in FIGS. 1 and 2. The FQR 100 includes a central body 102 and a plurality of arms 108 extending from the center body 102, each of the plurality of arms 108 including a distal portion 111 and a proximal portion 112. In addition, each of the plurality of arms 108 includes a motor block 106 having a rotor 162 and a propeller 160 for generating lift located at the distal portion 111 of each of the plurality of arms 108. In one aspect, each arm 108 includes the folding mechanism 110 configured for mid-flight extending or shortening a length of each of the plurality of arms 108.

As shown in FIG. 2-7C, each of the plurality of arms 108 includes a support member 180 for stability and support of each of the motor blocks 106. Each of the plurality of arms 108 further includes a bottom arm 182, a left arm 184, and a right arm 186. The bottom arm 182 includes a first bottom section 182A and a second bottom section 182B linked to the first bottom section 182A by a bendable portion 183. Similarly, the left arm 184 includes a first left section 184A and a second left section 184B linked to the first left section 184A by a bendable portion 185, while the right arm 186 includes a first right section 186A and a second right section 186B linked to the first right section 186A by a bendable portion 187. In the embodiment shown in FIGS. 1-11, four arms 108 are included. As shown in FIGS. 2, 6 and 7A-7C, in some embodiments each of the bottom arm 182, left arm 184, and right arm 186 is individually constructed in a truss configuration.

Figure 3:
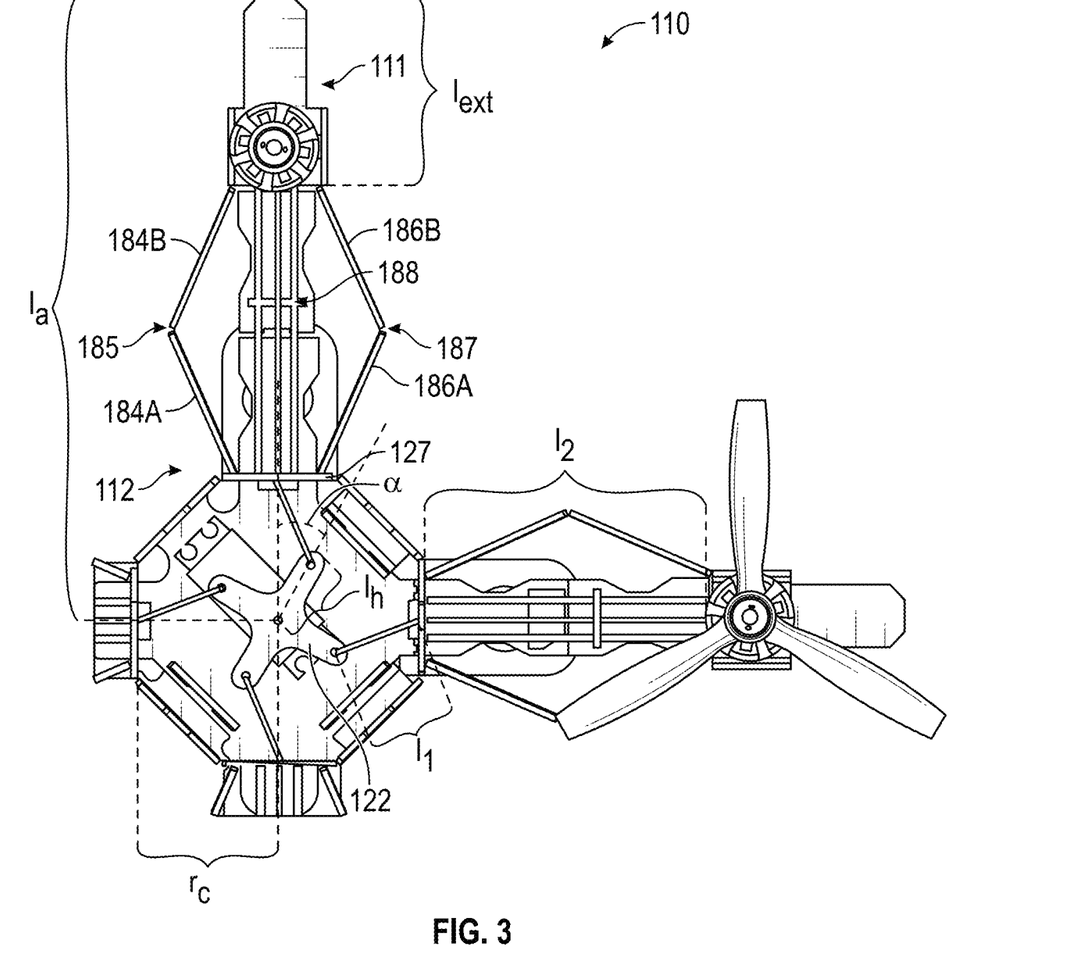
FIG. 3 is an illustration of a folding mechanism of the FQR of FIG. 1 illustrating geometric and mechanical principles of a servo-arm mechanism which is implemented with the FQR structure described herein.
Figure 7A:
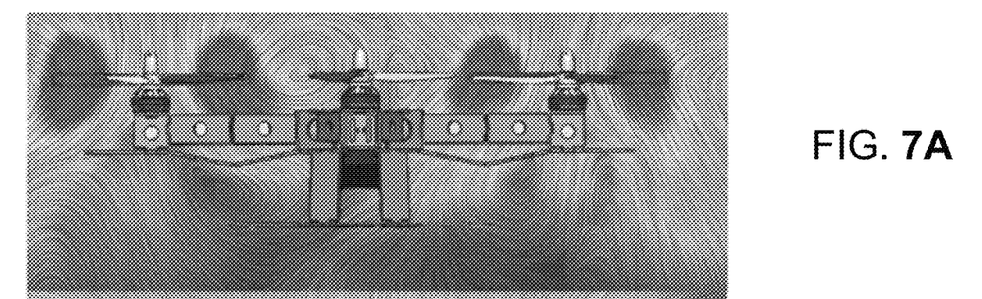
FIGS. 7A-7C are a series of illustrations of flow simulation results of the described FQR of FIG. 1 showing surrounding airflow velocity with the foldable arm of the FQR being 0%, 50%, and 100% withdrawn in FIG. 7A, FIG. 7B, and FIG. 7C, respectively.
Figure 7B:
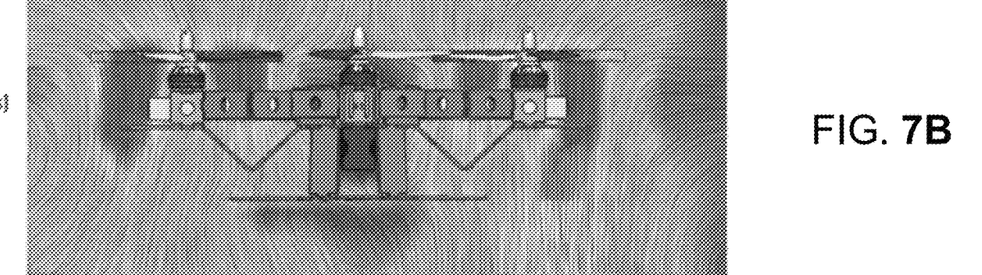
Figure 7C:
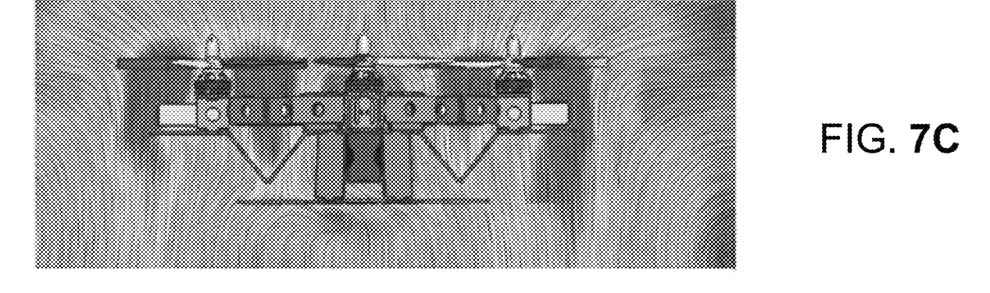

Referring to FIGS. 1-3, the center body 102 houses a servo motor 120 in operative association with a servo horn 122, and the processor 190 including an onboard controller 129 for control of each of the motor blocks 106 and the folding mechanism 110. In some embodiments, the servo motor 120 rotates clockwise or counterclockwise in co-operation with the servo horn 122, which rotates clockwise or counterclockwise with the servo motor 120. In some embodiments, the system 100 further includes a plurality of threads 188; one thread 188 for each of the plurality of arms 108. Each thread 188 defines a proximal end 188A engaged with the servo horn 122 and a distal end 188B engaged with a distal portion 111 of the respective arm 108. As shown specifically in FIG. 3, each of the plurality of threads 188 is tensioned such that upon clockwise or counterclockwise rotation of the servo horn 122 away from a midline, the threads 188 draw the distal portions 111 of each of the plurality of arms 108 toward the center body 102 as the bottom arm 182, the left arm 184 and the right arm 186 become folded, as shown in FIGS. 7B and 7C. Conversely, rotating the servo horn 122 clockwise or counterclockwise towards the midline de-tensions the plurality of threads 188 such that the bottom arm 182, the left arm 184 and the right arm 186 straighten out as shown in FIG. 7A. Since the bendable portions 183, 185 and 187 are tensioned such that their resting state is straightened out, de-tensioning the threads 188 using the servo horn 122 causes the bottom arm 182, the left arm 184 and the right arm 186 to straighten out and push the distal portions 111 of each of the plurality of arms 108 away from the center body 102. The rotation of the servo motor 120, and consequently, the length of each of the plurality of arms 108 is facilitated by the controller 129 and the processor 190. The notations and constants used in FIG. 3 and used for calculation (discussed further herein) are listed in Table I below.

As shown in FIG. 2, each arm 108 includes one of the plurality of motor blocks 106 located at the distal end 111 of each of the plurality of arms 108. Each motor block 106 includes one of the plurality of rotors 162 for rotation of one of the plurality of propellers 160. In some embodiments, each of the plurality of rotors 162 is in operative communication with the controller 129 and/or the processor 190. In some embodiments, the controller 129 takes commands from the processor 190, and in other embodiments the controller 129 and the processor 190 are one device. As each of the plurality of propellers 160 are rotated, the FQR 100 is lifted relative to the ground or is caused to hover above the ground. Further structural support is provided by the support members 180 which support the motor blocks 106 from underneath and provide a track mechanism such that the motor blocks 106 are supported and guided in a straight line when the motor blocks 106 are being pulled towards the central body 102 by the threads 188. Furthermore, the support members 180 prevent the plurality of arms 108 from bending down due to gravity.

As shown in FIG. 2, the central body 102 is engaged with a lower body 104 which provides additional structural support for the central body 102 and provides a landing platform such that the FQR 100 is stable upon landing. The central body 102 is formed from a base 125 and a plurality of wall segments 126 which collectively form a central wall 124. The central body 102 further includes a top cap 128 for engagement with the central wall 124. As stated above, the central body 102 houses the servo motor 120, the controller 129 and the receiver 121 (FIG. 1) which control the folding mechanism 110 and propellers 160.

In some embodiments shown in FIG. 3, the central wall 124 includes a plurality of thread apertures 127 each located at an intersection between the central wall 124 and each of the respective support members 180. As shown, when the servo motor 120 rotates, each of the plurality of threads 188 is pulled along by rotation of the servo motor 120. The thread apertures 127 are configured to allow the threads 188 to pass through the central wall 124 of the central body 102 and to the distal ends 111 of each of the plurality of arms 108. The thread apertures 127 also serve to straighten the threads 188 between the central wall 108 and the distal ends 111 of the arms 108 regardless of the angle of the servo motor 120.

In some embodiments, the system 100 includes the processor 190 comprising instructions that, when executed, cause the processor 190 to perform various functions. In some embodiments, the processor 190 may include the onboard controller 129 in direct or indirect communication with the processor 190, the servo motor 120 and the one or more rotors 162. As will be discussed in further detail, the processor 190 is operable to determine a trajectory of the FQR 100 using the Minimum Snap Generation Technique. The processor 190 is also operable to determine an angle of the servo motor 120 in order to lengthen or shorten the arms 108 of the FQR 100, which is in some embodiments is based on the trajectory determined by the processor 190 using a dynamic model. The processor 190 is also operable for determining ideal respective rotation speeds of the rotors 162 based on the trajectory. The angle of the servo motor 120 and the rotation speeds of the rotors 162 are electrically communicated from the processor 190 to the servo motor 120 and the rotors 162 by the onboard controller 129.

In some embodiments, the FQR 100 further includes a plurality of sensors having one or more of the following features: a camera, a proximity sensor, an inertial measurement unit (IMU) and/or a global positioning system. These plurality of sensors may be operable for determining a position of the FQR 100, determining a spatial orientation of the FQR 100, and/or determining a presence of obstacles. In some embodiments, at least one of the processors 190 may be operable for adjusting the trajectory based on an input (determined position and orientation of the FQR 100 and/or the presence of obstacles from the plurality of sensors). In some embodiments, the adjustment is made on-board by the controller 129.

In some embodiments, the controller 129 is in operative communication with the processor 190 by way of the receiver 121. The receiver 121 is operable to receive commands from the processor 190 if the processor 190 is located external to the FQR 100. In other embodiments, the processor 190 including the controller 129 are located onboard. In other embodiments, the only processor 190 involved is the controller 129 itself of the FQR 100. If the particular embodiment of the FQR 100 requires more processing power than the controller 129 can provide, various functionalities can be divided amongst more than one processor 190 including the controller 129.

Manufacturing Process

In some embodiments, the FQR 100 frame may be manufactured from 6 ply cardboards, and/or fiberglass, mylar and acetate sheet and heat adhesive. In some embodiments, all of the layers are cut separately using a laser cutter before finally being heated and compressed. The four layers of cardboard function as the support structure of the mechanism. The mylar and acetate sheet, which is flexible and durable, functions as hinges and connects all the separate sections of the FQR 100 together. The heat adhesive is placed between each of other two layers to connect them tightly.

Figure 4:
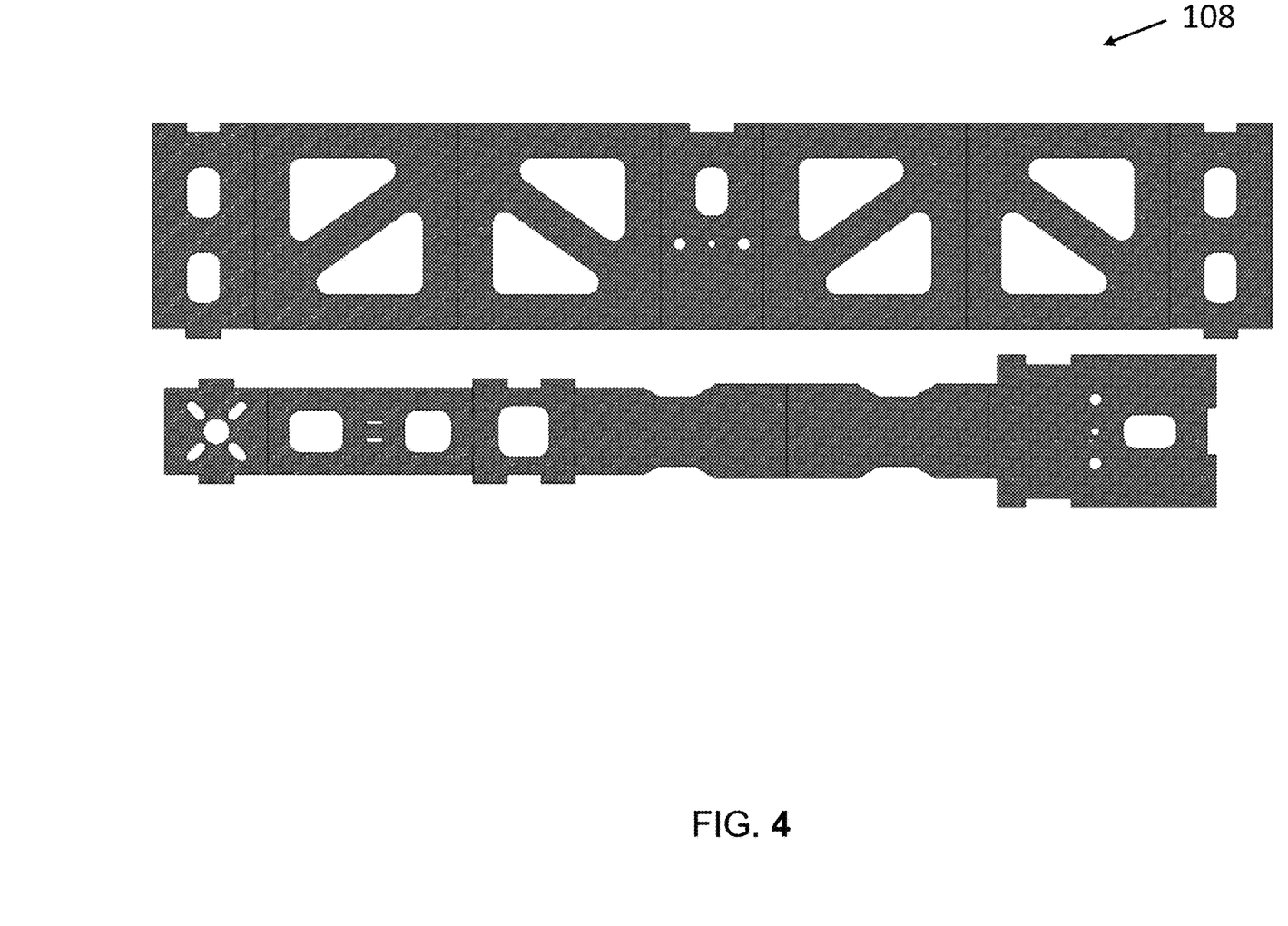
FIG. 4 is an image illustrating an unfolded laminate structure of an arm of the FQR of FIG. 2.
Figure 5:
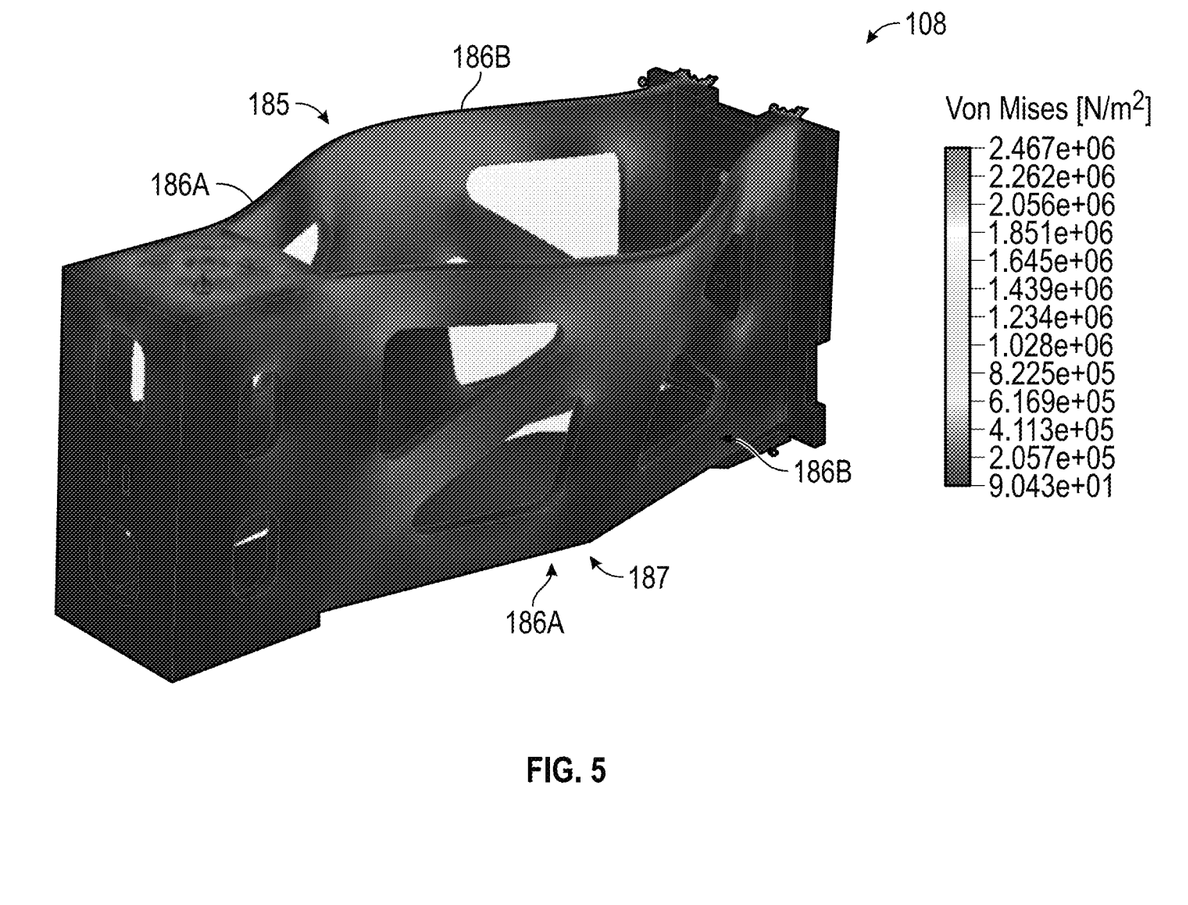
FIG. 5 is a perspective view of the arm and a Von Mises stress plot of the arm of FIG. 4 when assembled.
Figure 6:
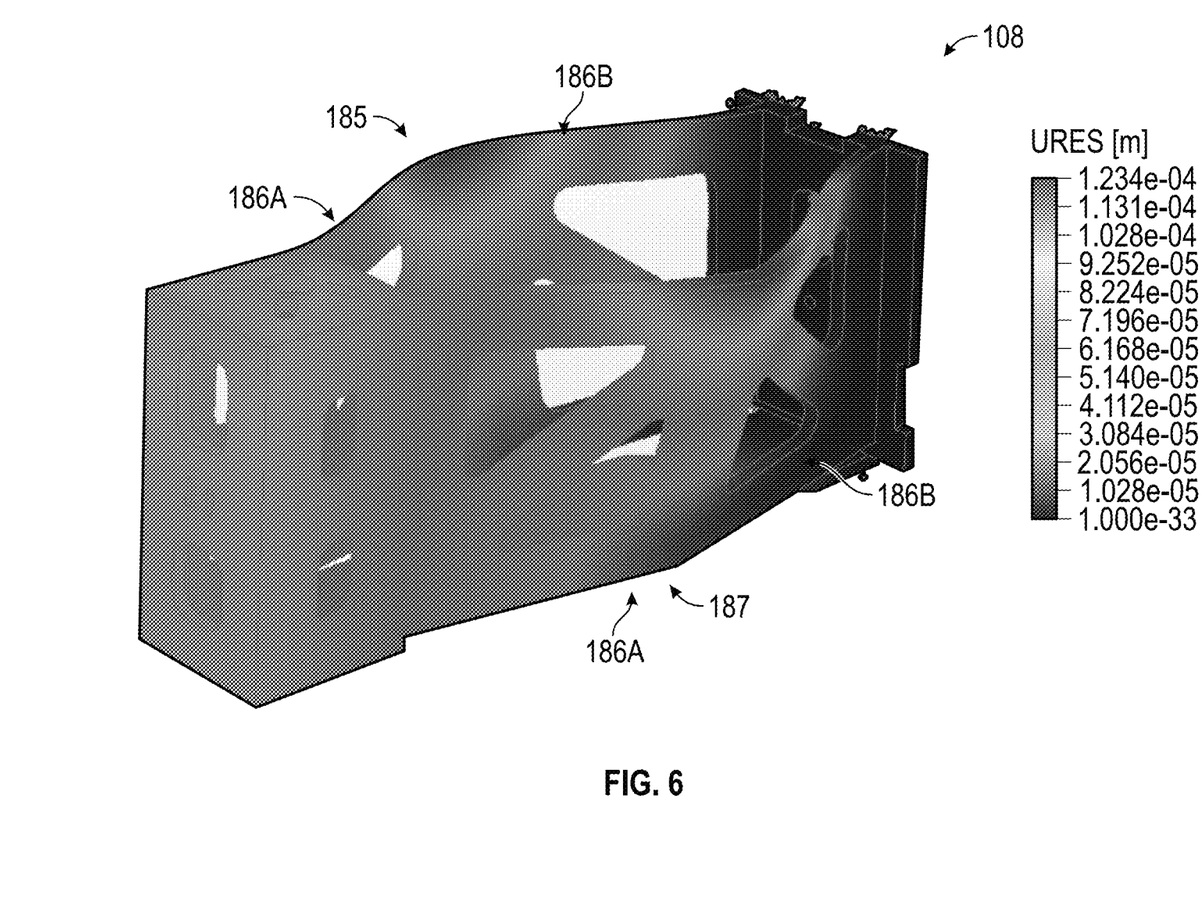
FIG. 6 is a perspective view of the arm and a displacement plot of the arm of FIG. 4 when assembled.

The main structure of the FQR 100 may be composed of four pieces of laminate structure, the first piece is shown in FIG. 4 which includes the central body 102, the plurality of motor blocks 106 and the plurality of arms 108. The remaining three pieces may define or include the lower body 104, top cap 128 and central wall 124.

TABLE I

Variables and constants of the FQR

| Constants and Variables' Name | Notation |
| --- | --- |
| String length | $l_{str} \in \mathbb{R}^+$ |
| Servo horn radius | $l_h \in \mathbb{R}^+$ |
| Central body radius | $r_c \in \mathbb{R}^+$ |
| Extended arm length | $l_{ext} \in \mathbb{R}^+$ |
| Arm length | $l_a \in \mathbb{R}^+$ |
| String length from servo horn to central wall | $l_1 \in \mathbb{R}^+$ |
| String length from central wall to motor block | $l_2 \in \mathbb{R}^+$ |
| Servo motor angle | $\alpha \in \mathbb{R}^+$ |
| Total thrust | $u_1 \in \mathbb{R}^+$ |
| Moment of the three axis in body frame | $u_2, u_3, u_4 \in \mathbb{R}^+$ |
| Motor angle command to control arm length | $u_5 \in \mathbb{R}^+$ |
| Position in the inertial frame | $r \in \mathbb{R}^+$ |
| Rotation matrix of the FQR | $R \in \mathbb{R}^{3 \times 3}$ |
| Euler angles in the inertial frame | $\theta \in \mathbb{R}^3$ |
| Angular velocity in the inertial frame | $\omega \in \mathbb{R}^3$ |
| Thrust from each group of motor and propeller | $F_i \in \mathbb{R}^+$ |
| Moment from each group of motor and propeller | $M_i \in \mathbb{R}^+$ |
| Rotor thrust constant | $k_F \in \mathbb{R}^+$ |
| Rotor moment constant | $k_M \in \mathbb{R}^+$ |
| Constant of the position error | $k_x \in \mathbb{R}^+$ |
| Constant of the translational velocity error | $k_v \in \mathbb{R}^+$ |
| Current/desired position | $x/x_d \in \mathbb{R}^3$ |
| Current/desired translational velocity | $v/v_d \in \mathbb{R}^3$ |
| Current/desired rotation matrix | $R/R_d \in \mathbb{R}^{3 \times 3}$ |
| Current/desired body frame angular velocity | $\Omega/\Omega_d \in \mathbb{R}^3$ |
| Unit vector along the Z axis of the inertial frame | $e_3 \in \mathbb{R}^3$ |
| Actual/desired moment of inertia matrix | $J/J_d \in \mathbb{R}^{3 \times 3}$ |
| (Maximum) error between $J$ and $J_d$ | $J_M/\tilde{J} \in \mathbb{R}^{3 \times 3}$ |

Aerodynamic Analysis of the FQR

Based on a CAD model, SOLIDWORKS Flow Simulation was used to analyze the surrounding air flow condition of the FQR 100, where the FQR 100 is maintained steadily at the same location but change the arm length to 0% withdrawn (fully extended), 50% withdrawn and 100% withdrawn (fully folded) during three different simulations. The air flow is only driven by the rotation of the four propellers 160 and the surrounding boundary conditions are set to be steady atmospheric pressure. The results are shown in FIGS. 7A-7C.

When the arms 108 of the FQR 100 are fully extended, the horizontal ambient air flows at much higher velocity compared to the 50% and 100% withdrawn cases. However, the air below the FQR 100 shows lower velocity compared to the other two groups. From the simulation results, when the arms are fully expanded, the ground effect below the FQR 100 will be less significant and it can provide the FQR 100 with improved control when operating close to the ground. When the arms 108 are withdrawn, the ground effect is more significant but the surrounding air flow is slower which means the FQR 100 will have improved control in smaller spaces. When its "wingspan" is smaller such as when the arms 108 are drawn inward, the FQR 100 can also fly through holes or gaps that are too small for its extended size to bypass.

Modeling of the FQR

This section describes the dynamic model of the FQR 100. The geometric relationship between the servo motor 120 and the length of the arms 108 is first introduced. Then, the dynamic model of the arm folding/extension is tested, as well as the geometric relationships between the length of the arms 108 and moment of inertia. With the arm length dynamic model, the complete dynamic model of the FQR 100 can be determined. In this description, it is assumed that all components of the FQR 100 are rigid (with the exception of the bendable portions 183, 185, and 187 of the bottom arms 182, the left arms 184 and the right arms 185) to simplify the model.

Coordinates and Notation

Figure 8:
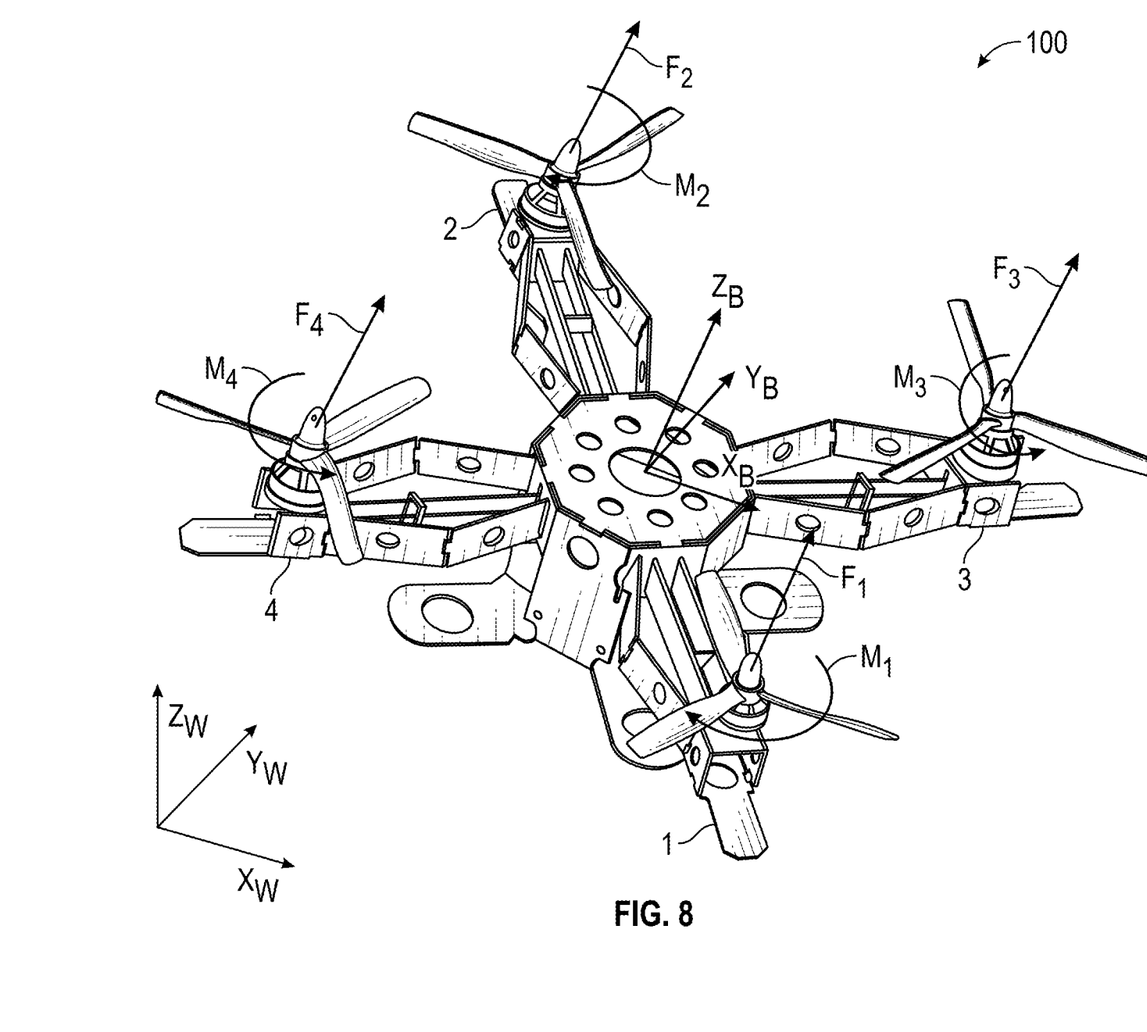
FIG. 8 is a perspective view of the FQR of FIG. 1 illustrating axes and frames of the FQR.

To model and control the FQR 100, a simulated world frame and a simulated body frame were set up as shown in FIG. 8. $X_W$, $Y_W$, and $Z_W$ are the three axes in the simulated world frame (inertial frame), which do not change or move during the flight of the FQR 100. The simulated body frame, which includes $X_B$, $Y_B$, and $Z_B$, will translate and rotate along with the FQR 100. For each group of the rotor 162 and propeller 160, the thrust and moment generated are $F_i$ and $M_i$ with respect to the notation number of the rotor 162.

Identification of Arm Length Dynamics

The length of the arms 108 of the FQR 100 is controlled by the servo motor 120, which in some embodiments may be a MG996R motor. When working under a constant load, the servo motor 120 will maintain a constant rotational speed, and as the load increases, the rotational speed of the servo motor 120 will slow until stalling. As described herein, bench tests were performed to conduct system identification with a VICON motion capture system. Since a servo motor 120 is used, the input and output of the model are the desired motor angle and actual lengths of the arms 108, respectively.

To calculate the desired motor angle, the corresponding servo motor angle must be calculated based on the geometry relationship in FIG. 3 and Table I.

$$\begin{cases} l_{str} = l_1 + l_2 \\ l_1 = \sqrt{(l_h \sin\alpha)^2 + (r_c - l_h \cos\alpha)^2} \end{cases} \quad (1)$$

Since $l_{str}$ can be measured, the expression of arm length $l_a$ is as follows:

$$\begin{aligned} l_a &= l_{str} + l_{ext} + r_c - \sqrt{(l_h \sin\alpha)^2 + (r_c - l_h \cos\alpha)^2} \\ &= l_{str} + l_{ext} + r_c - \sqrt{l_h^2 + r_c^2 - 2r_c \cos(\alpha)} \end{aligned} \quad (2)$$

From equation (2), the motor angle command can be calculated given desired arm length. Note that the y-axis of the figure is the folding distance, which is the distance withdrawn. With the system identification toolbox from MATLAB, the following second-order arm length dynamics are identified. Here, the time domain index t is omitted for brevity.

$$\ddot{l}_a = -13.88 \dot{l}_a - 77.40 l_a + 73.84 u_5, \quad (3)$$

The system 100 has a bandwidth of 1.18 Hz, which presents a limit on how fast the arms 108 can be folded or extended given the chosen servo motor 120 as well as the material and design.

Complete Dynamics of the FQR

Adding the servo-arm dynamics into the original quadrotor system dynamics, the complete dynamic system of the FQR 100 can be described as $\dot{x}=f(x)+g(x)u$:

$$\begin{bmatrix} \ddot{r} \\ \dot{r} \\ \dot{\omega} \\ \dot{\theta} \\ \ddot{l}_a \\ \dot{l}_a \end{bmatrix} = \begin{bmatrix} -gZ_W + \frac{u_1}{m} Z_B \\ \dot{r} \\ J(l_a)^{-1}\left[-\omega_{BW} \times J(l_a)\omega_{BW} + \begin{bmatrix} u_2 \\ u_3 \\ u_4 \end{bmatrix}\right] \\ \omega \\ -13.88 \dot{l}_a - 77.40 l_a + 73.84 u_5 \\ \dot{l}_a \end{bmatrix} \quad (4)$$

where $x=[\dot{r}\ r\ \omega\ \dot{l}_a\ l_a]^T \in \mathbb{R}^{14}$ and $u \in \mathbb{R}^a$. Since the moment of inertia changes with the length of the arms 108, the J matrix is now functions of arm length $l_a$.

$$J(l_a) = \begin{bmatrix} J_{xx}(l_a) & 0 & 0 \\ 0 & J_{yy}(l_a) & 0 \\ 0 & 0 & J_{zz}(l_a) \end{bmatrix} \quad (5)$$

Figure 9:
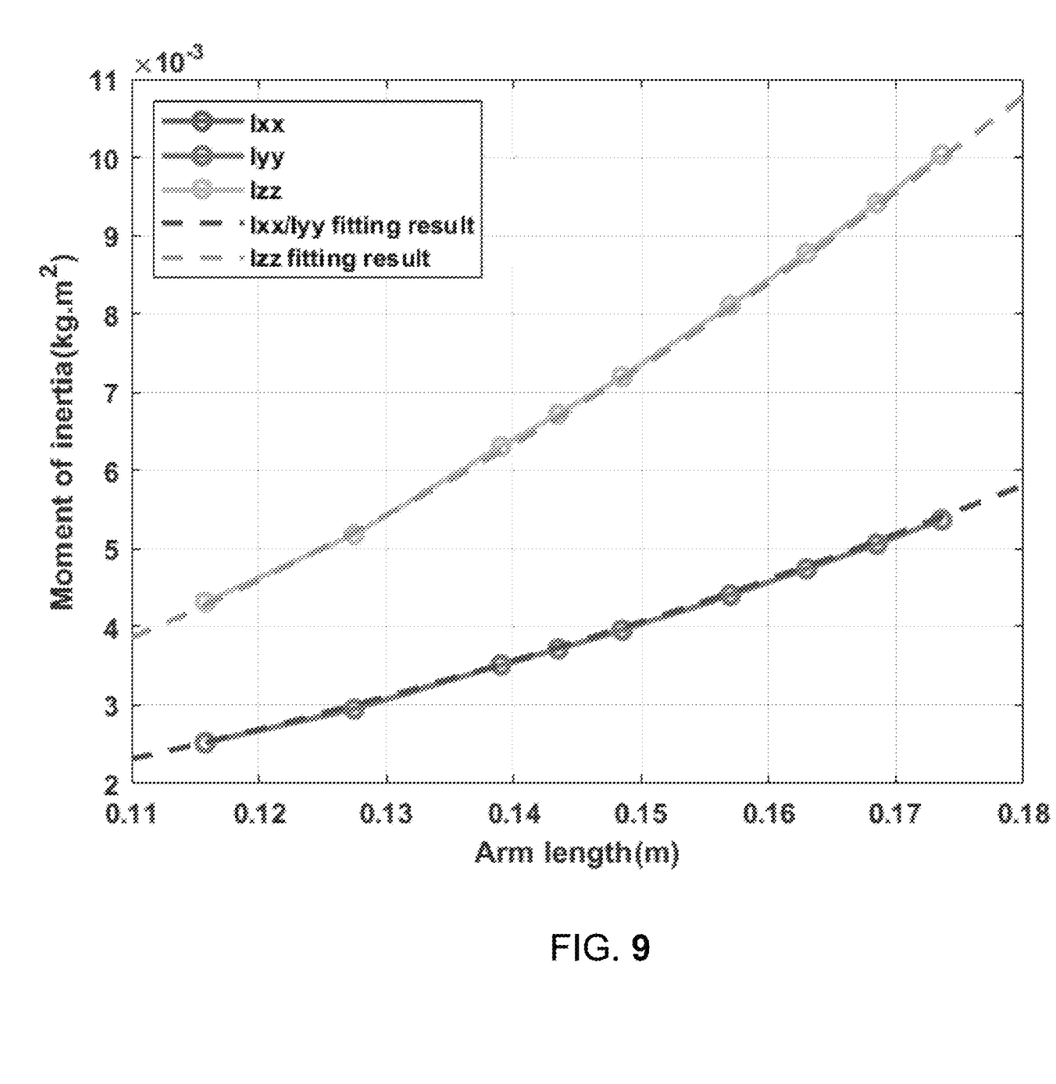
FIG. 9 is a graph illustrating fitting of moment of inertia with arm length changes associated with the FQR of FIG. 1.

To find out the relation between the length of the arms 108 and moment of inertia, a traditional way is to calculate every component's moment of inertia and sum them up to obtain the total moment of inertia. However, origami structure has very complex geometry and to simplify the calculation many assumptions need to be made. To improve the estimation accuracy, SOLIDWORKS Mass-Property toolbox was used to obtain $J(l_a)$ when the arms 108 are withdrawn at different percentages. Based on the experimental data, it is possible to achieve parabolic fitting and obtain the relation between arm length and moment of inertia as shown in equation (6). Experimental data and fitting results are shown in FIG. 9.

$$\begin{cases} J_{xx} = J_{yy} = 0.205 l_a^2 - 0.0095 l_a + 0.00088, \\ J_{zz} = 0.41 l_a^2 - 0.02 l_a + 0.0011, \end{cases}$$

$$0.0025 \le J_{xx} = J_{yy} \le 0.0054,$$

$$0.0043 \le J_{zz} \le 0.0100.$$

It should be noted that since the length of the arms 108 can only be changed within a certain range, the moment of inertia also can only vary within a certain range with respect to $l_a$. After defining the dynamic system of the FQR 100, to calculate the rotating speed of each rotor 162, the following equation set is used in which $k_F$ and $k_M$ are defined in Table I.

$$\begin{bmatrix} u_1 \\ u_2 \\ u_3 \\ u_4 \end{bmatrix} = \begin{bmatrix} 1 & 1 & 1 & 1 \\ 0 & k_F l_a & 0 & -k_F l_a \\ -k_F l_a & 0 & k_F l_a & 0 \\ k_M & -k_M & k_M & -k_M \end{bmatrix} \begin{bmatrix} \omega_1^2 \\ \omega_2^2 \\ \omega_3^2 \\ \omega_4^2 \end{bmatrix}$$

$$F_i = k_F \omega_i^2, \; M_i = k_M \omega_i^2$$

It should be noted that $l_a$ now is one of the state in the dynamics system and it is controlled by $u_5$ in equation (3).

Controller Design and Stability Analysis

This section introduces feedback controller design and Lyapunov stability analysis for the FQR model defined in equation (4). With this controller, the FQR 100 will be able to follow the planned trajectory with arm folding/extension, and the closed-loop system will be robust to the modeling uncertainties caused by the changes of the length of the arms 108.

Controller Design

To control the FQR 100 to follow the trajectory, the following translational position and velocity errors are first calculated, as well as orientation and body frame rotational velocity errors:

$$e_x = x - x_d \tag{9}$$

$$e_v = v - v_d \tag{10}$$

$$e_R = \tfrac{1}{2}(R_d^T R - R_T R_d)^\vee \tag{11}$$

$$e_\psi = \Omega - R^T R_d \Omega_d \tag{12}$$

Note that in equation (11) the vee map "$\vee$" is the inverse operator of the hat operator, which transforms a matrix back to a vector.

Proof of Lyapunov Stability

The Lyapunov stability method is used to prove that the FQR 100 is stable and the error for both translational and rotational movement can converge. Because of the additional one degree of freedom of the FQR 100, the rotational dynamics of the FQR 100 is different from a normal quadrotor. Since the FQR 100 has the same position control loop dynamics, the force input and stability proof in the position loop may be identical to previous proofs. However, the moment input must be modified to account for the changing length of the arms 108 in the attitude control loop. The control inputs to the system are first defined. The notations can be found in Table I.

$$F = -(-k_x e_x - k_u e_u - mge_3 + m\ddot{x}_d) \cdot \text{Re}_3 \tag{13}$$

$$M_a = -k_R e_R - k_\Omega e_\Omega - J_d(\hat{\Omega} R^T R_d \Omega_d - R^T R_d \dot{\Omega}_d) + \Omega \times J_d \Omega - \|e_A\| J_M(\|\alpha_d\| + \|\Omega\|^2), \tag{14}$$

Where $e_A = e_\Omega + c e_R$, $\alpha_d = \hat{\Omega} R^T R_d \Omega_d - R^T R_d \dot{\Omega}_d$. Moreover, $c$ satisfies $$c < \min \left\{ \sqrt{\frac{2 b_1 k_R \lambda_m}{\lambda_M^2}}, \; \frac{\sqrt{2}\left(k_\Omega - \tfrac{1}{2} J_B\right)}{3 \lambda_M}, \; \frac{k_R k_\Omega - \tfrac{1}{2} J_B k_R}{\tfrac{1}{4}(k_\Omega - J_B)^2 + \tfrac{3 k_R}{\sqrt{2}} \lambda_M} \right\}$$

Proof: For simplicity, only a sketch of the proof will be shown. In this disclosure, the following Lyapunov function candidate is used:

$$V = \tfrac{1}{2} e_\Omega^T J e_\Omega + k_R \Psi(R, R_d) + c e_\Omega^T J e_R, \tag{15}$$

where c is a constant. Let $\zeta = [\|e_R\|, \|e_\Omega\|]^T \in \mathbb{R}^2$, and one can obtain $V \leq \zeta^T P \zeta$ with $$P = \begin{bmatrix} b_1 k_R & \tfrac{1}{2} c \lambda_M \\ \tfrac{1}{2} c \lambda_M & \tfrac{1}{2} \lambda_m \end{bmatrix},$$

and it is contemplated that $\Psi(R, R_d) \geq b_1 \|e_R(R, R_d)\|^2$. $\lambda_M$ and $\lambda_m$ are the largest and smallest eigenvalues of J, respectively. The next step is to prove $\dot{V}$ is negative definite.

$$\dot{V} = e_\Omega^T J \dot{e}_\Omega + \tfrac{1}{2} e_\Omega^T \dot{J} e_\Omega + k_R e_R^T e_\Omega + c e_\Omega^T J \dot{e}_R + c e_R^T J \dot{e}_\Omega + c e_\Omega^T \dot{J} e_R \tag{16}$$

Since the moment of inertia, J, is no longer a constant, the derivative matrix of J can be calculated as follows:

$$\dot{J}(l_a) = [J_{ij} \dot{l}_a]_{i,j=1,2,3} \tag{17}$$

As seen in equation (2), the relation between the servo motor angle and arm length is linked geometrically, the derivation of the arm length can be calculated as below:

$$-\frac{\pi}{42} \leq \dot{l}_a = -\frac{\dot{\alpha} a_1 \sin \alpha}{2 \sqrt{a_2 - a_1 \cos \alpha}} \leq \frac{\pi}{42}, \tag{18}$$

where $a_1 = 2 r_c l_h$, $a_2 = l_h^2 + r_c^2$. Therefore, $\dot{J}$ is bounded and the 2-norm of the bound matrix is $J_B$.

Based on the dynamic model of equation (4) and error definition of equation (12), it can be derived that:

$$J \dot{\Omega} = (M_a - \Omega \times J \Omega) \tag{19}$$

$$J \dot{e}_\Omega = J \dot{\Omega} + J(\hat{\Omega} R^T R_d \Omega_d - R^T R_d \dot{\Omega}_d)$$

$$= M_a - \Omega \times J \Omega + J(\hat{\Omega} R^T R_d \Omega_d - R^T R_d \dot{\Omega}_d) \tag{20}$$

Now substituting the control input of $M_a$ defined in equation (14) into the equation above, one can reach:

$$J \dot{e}_\Omega = -k_R e_R - k_\Omega e_\Omega + \Omega \times \tilde{J} \Omega + \tilde{J} \alpha_d - \|e_A\| J_M (\|\alpha_d\| + \|\Omega\|^2), \tag{21}$$

where $\tilde{J} = J - J_d$. Since both $J_d$ and J are bounded, $\tilde{J}$ is also bounded and the 2-norm of upper bound matrix is defined as $J_M$. Now plug equation (21) into equation (16), the derivative of V is derived as follows:

$$\dot{V} = -k_\Omega \|e_\Omega\|^2 - c k_R \|e_R\|^2 + e_A^T (\tilde{J} \alpha_d + \Omega \times \tilde{J} \Omega) + c e_\Omega^T J \dot{e}_R + \tag{22}$$

$$e_R^T (c \dot{J} - c k_\Omega I_3) e_\Omega + \tfrac{1}{2} e_\Omega^T \dot{J} e_\Omega - \|e_A\| J_M (\|\alpha_d\| + \|\Omega\|^2),$$

Based on the definition of sgn function and Cauchy-Schwarz inequality, one can find the following bounds for the items in the above equation:

$$e_A^T \tilde{J} \alpha_d \leq J_M \|e_A\| \cdot \|\alpha_d\|,$$

$$e_A^T (\Omega \times \tilde{J} \Omega) \leq J_M \|e_A\| \cdot \|\Omega\|^2.$$

Therefore, the third and seventh items of (22) get canceled out:

$$\dot{V} \leq -k_\Omega \|e_\Omega\|^2 - c k_R \|e_R\|^2 + c e_\Omega^T J \dot{e}_R + e_R^T (c \dot{J} - c k_\Omega I_3) e_\Omega + \tfrac{1}{2} e_\Omega^T \dot{J} e_\Omega \tag{23}$$

Considering the bound of $\dot{J}$, the inequality above can be further constrained as $$\dot{V} \leq -k_\Omega \|e_\Omega\|^2 - c k_R \|e_R\|^2 + c e_\Omega^T J \dot{e}_R + c(J_B - k_\Omega) \|e_R\| \cdot \|e_\Omega\| + \tfrac{1}{2} J_B \|e_\Omega\|^2 \tag{24}$$

One can get $\dot{V} \leq -\zeta^T Q \zeta$ where $$Q = \begin{bmatrix} ck_R & \frac{c(k_\Omega - J_B)}{2} \\ \frac{c(k_\Omega - J_B)}{2} & k_\Omega - \frac{3c}{\sqrt{2}}\lambda_M - \frac{1}{2}J_B \end{bmatrix}$$

Therefore, to make P>0 and Q<0, the constraints for c is identified. This completes the proof.

Minimum Snap Trajectory Generation Method

This section demonstrates how the FQR 100 can affect the planned trajectory by folding the arms 108 while flying through obstacles.

As disclosed herein, the minimum snap trajectory planning method is employed to generate trajectory for the FQR 100. However, unlike conventional quad-rotors, $l_a$ and its derivatives are also states of the state space model of the FQR 100 as can be noticed in equation (7), $u_5$ is the input to the horn motor that controls the length of the arms 108 of the FQR 100. Therefore it is obvious that in addition to x, y, z and ψ (yaw angle), $l_a$ is also one flat output. Let $\Phi=[x, y, z, \psi, l_a]^T$, the objective function for motion planning is modified as follows:

$$\min_\Phi \int_{t_0}^{t_m} \mu_r \left\| \frac{d^{k_r} r_T}{dt^{k_r}} \right\|^2 + \mu_\psi \left( \frac{d^{k_\psi} \psi_T}{dt^{k_\psi}} \right)^2 + \mu_{l_a} \left( \frac{d^{k_{l_a}} l_a}{dt^{k_{l_a}}} \right)^2, \quad (25)$$

$x(1) = (0, 0, 0), \dot{x}(1) = (0, 0, 0), \ddot{x}(1) = (0, 0, 0)$ $x(2) = (2, 0, 0), \dot{x}(2) = (0.1, 0, 0), \ddot{x}(2) = (0, 9.8, 0)$ $x(3) = (2, 3, 0), \dot{x}(3) = (1.0, 0, 0), \ddot{x}(3) = (0, 0, 0)$ $x(4) = (0, 0, 0), \dot{x}(4) = (0, 0, 0), \ddot{x}(4) = (0, 0, 0)$ where $t_0$ and $t_m$ are the start and end time for motion planning, $\mu_r$, $\mu_\psi$, and $\mu_{l_a}$ are the weighting factors. As for the constraints, the number inside the brackets indicate the corresponding waypoint number, so in this case there are four waypoints. For $k_\psi$, since the input $u_4$ appears in the second derivative, $k_\psi$ is chosen to be 2. In the case of the FQR 100, as shown in equation (3), $u_5$ also appears in the second derivative, so $k_{l_a}$ is also selected to be 2.

In the simulation, the FQR 100 will remain at the same height (z is the same throughout the entire trajectory) and travel along the x axis to fly through a tilted window. The window width is large enough for the FQR 100 to pass without collision, but the height will be comparatively limited. The FQR 100 uses equation (25) to generate trajectory and low-level motion controller shown in equations (13) and (14) is implemented. For comparison, a conventional quad-rotor case was shown, where motion planning was conducted using the same method without considering arm folding, and motion control follows.

Figure 10A:
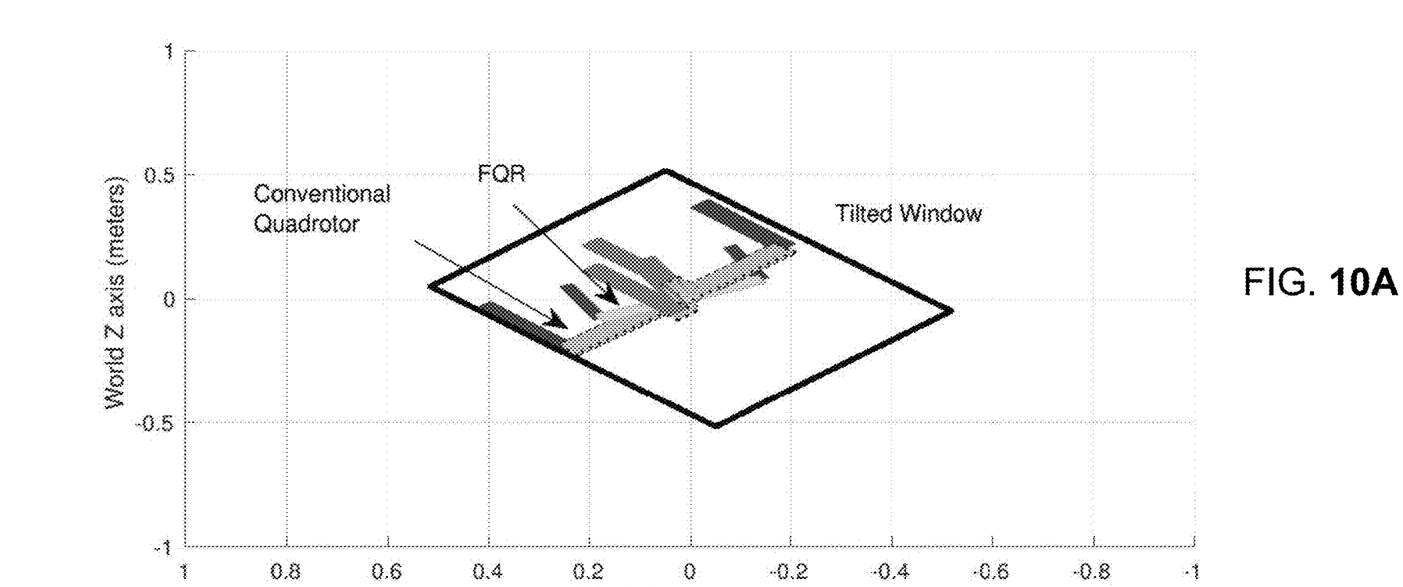
FIGS. 10A-10C are a series of graphs illustrating orientation of the FQR of FIG. 1 compared with conventional quad-rotors when flying through a window (top, FIG. 10A); planned and actual roll angles of the FQR during the flight (bottom left, FIG. 10B); and planned and actual roll angles of the conventional quad-rotor during flight (bottom right, FIG. 10C)
Figure 10B:
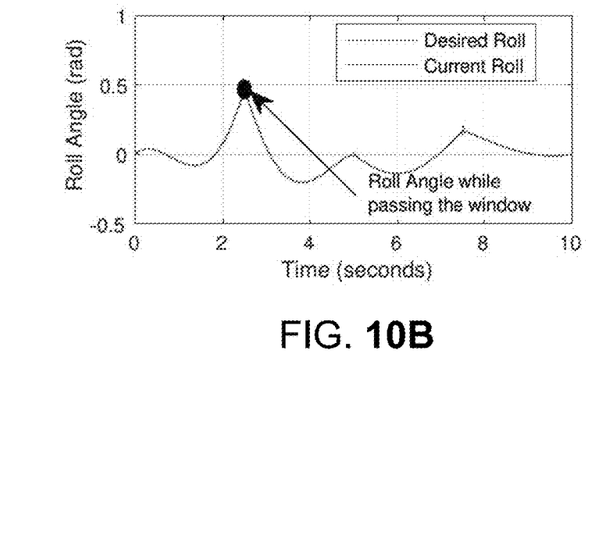
Figure 10C:
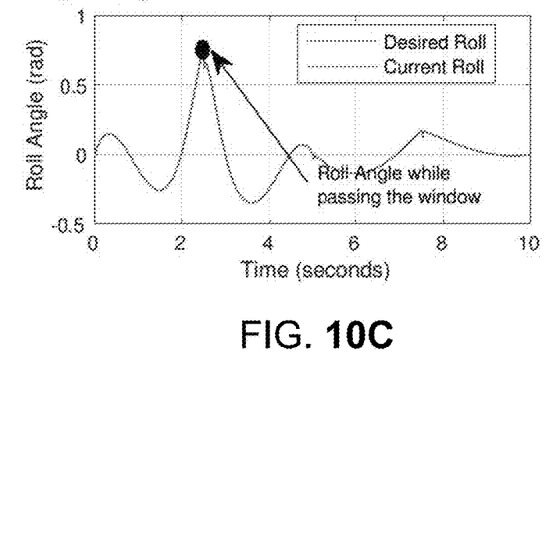
Figure 11:
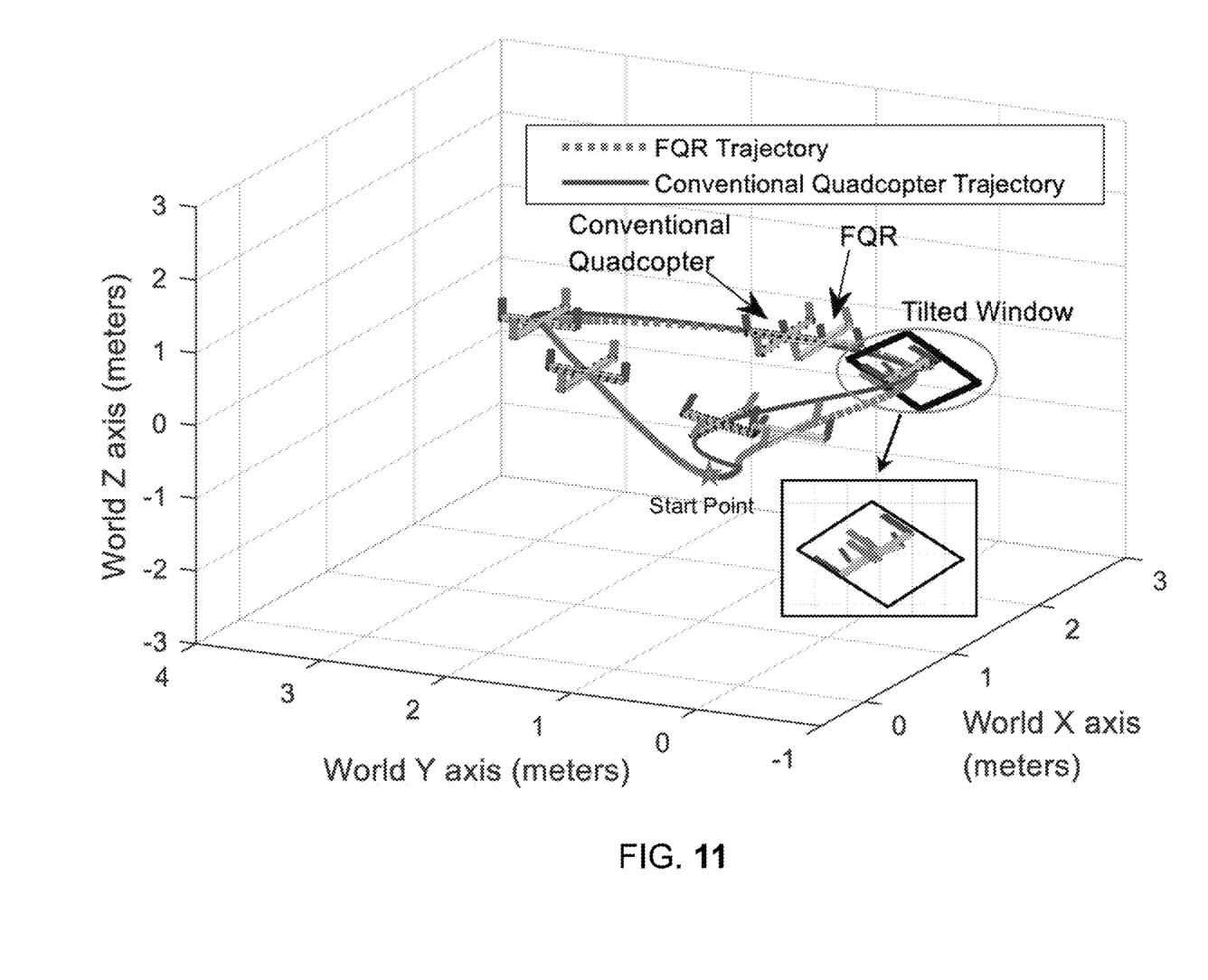
FIG. 11 is a three-dimensional graph illustrating trajectory planning of the FQR and a conventional quad-rotor to fly through a tilted window.

As shown in FIG. 9, when the FQR 100 is navigated through the window, it folds its arms and the rolling angle is much smaller than that of the conventional quad-rotor, which reduces the energy cost and risk of hitting the window frame due to imperfect motion control. It is also demonstrated that the low-level feedback controller could track the desired roll angle perfectly. FIGS. 10A-10C show the entire trajectory with three waypoints based on the minimum snap trajectory generation shown in equation (25). With the foldable arms 108, the FQR 100 can achieve smaller roll angles for obstacle avoidance, as well as shorter yet smoother trajectory, compared to the conventional quad-rotor.

CONCLUSION

In the present disclosure, an origami-inspired FQR 100 was developed using cardboard. With its arms 108 extended or folded, the FQR 100 could change the moment of inertia and ambient air flow velocity. A feedback controller was developed to guarantee stability with changing arm lengths, and the minimum snap trajectory generation approach was extended to plan the position, yaw angle, and the arm length. Simulation results were provided to demonstrate the advantage of this FQR 100 design when flying through obstacles, as well as the precision of position and orientation control of the FQR 100.

What is claimed is:

1. A device, comprising:
    a central body housing a controller and a servo motor in operative communication with the controller, the servo motor operatively engaged with a servo horn, the servo horn being rotatable by the servo motor;
    a plurality of foldable arms in operative engagement with the central body, each of the plurality of foldable arms defining a proximal portion and a distal portion, the proximal portion operatively engaged with the center body such that each of the plurality of foldable arms extends laterally from the center body;
    a propeller in operative association with a rotor and located at the distal portion of each of the plurality of foldable arms, wherein the rotor is in operative communication with the controller; and
    a plurality of threads operatively associated with the servo motor, each of the plurality of threads configured to be tensioned or de-tensioned upon rotation of the servo motor and having a proximal end engaged with the servo horn and a distal end engaged with the distal portion of each of the plurality of foldable arms such that the distal portions of each of the plurality of foldable arms are drawn towards the central body when each of the plurality of threads are tensioned.

2. The device of claim 1, further comprising a lower body configured for engagement with the center body, the lower body including a plurality of feet.

3. The device of claim 2, wherein the lower body further comprises a plurality of foldable tabs configured for engagement with the central body.

4. The device of claim 1, wherein the controller is in operative communication with one or more processors.

5. The device of claim 4, wherein the one or more processors comprise instructions which, when executed, cause the controller to determine a trajectory.

6. The device of claim 5, wherein the one or more processors comprise instructions, which, when executed, cause the controller to actuate the servo motor based on the trajectory.

7. The device of claim 5, wherein the one or more processors comprises instructions, which, when executed, cause the controller to actuate the rotors based on the trajectory.

8. The device of claim 4, further comprising:
    one or more sensors, the sensors being operable to determine a position of the device, an orientation of the device, and/or a presence of any obstacles.

9. The device of claim 8, wherein the one or more processors comprise instructions which, when executed, cause the controller to adjust a trajectory of the device based on the determined position and/or orientation of the device and/or the determined presence of obstacles by the one or more sensors.

10. The device of claim 1, wherein each foldable arm of the plurality of foldable arms further includes a first section and a second section divided by a bendable portion, wherein the second section folds into the first section when the distal portions of each of the plurality of foldable arms are drawn towards the central body.

11. The device of claim 1, wherein the central body comprises a central wall, wherein the central wall is comprised of a plurality of wall segments.

12. The device of claim 11, wherein the central wall further comprises a plurality of thread apertures, wherein one of the plurality of threads is disposed through one of the plurality of thread apertures.

13. The device of claim 11, wherein the servo horn comprises a plurality of holes, and where one of the plurality of threads is engaged with the servo horn through one of the plurality of holes.

14. The device of claim 1, wherein each of the plurality of foldable arms comprises:
   a support member engaged with the center body; and
   a plurality of foldable strips sheathing the support member, each of the plurality of foldable strips including a bendable portion.

15. The device of claim 14, wherein each bendable portion of each foldable strip of each of the plurality of foldable arms is tensioned such that each distal portion of the plurality of foldable arms are drawn away from the central body when each of the plurality of threads are de-tensioned.

16. A mechanism, comprising:
   a center body, the center body comprising:
      a servo motor in operative association with a servo horn, the servo motor being operable to rotate the servo horn at an angle relative to a central position of the servo horn; and
      a thread defining a proximal end and a distal end, the proximal end of the thread being engaged with the servo horn;
   a foldable arm, the foldable arm defining a distal end, the foldable arm comprising:
      a support member engaged with the center body; and
      a plurality of foldable strips sheathing the support member, each of the plurality of foldable strips including a bendable portion;
   wherein the distal end of the foldable arm is engaged with the distal end of the thread;
   wherein when the angle of the servo horn is increased relative to the central position of the servo horn, the thread is tensioned such that the distal end of the thread is drawn towards the center body such that the distal end of the foldable arm is drawn towards the center body; and
   wherein when the angle of the servo horn is decreased relative to the central position of the servo horn, the thread is de-tensioned such that the distal end of the thread is drawn away from the center body such that the distal end of the foldable arm is drawn away from the center body.

17. The mechanism of claim 16, wherein each bendable portion of the plurality of foldable strips is tensioned such that a resting position of the plurality of foldable strips is a straightened position.

18. The mechanism of claim 17, wherein when the thread is de-tensioned, the plurality of foldable strips becomes straightened out and draws the distal end of the foldable arm away from the center body.

19. The mechanism of claim 16, wherein each bendable portion is caused to bend when the thread is tensioned such that each of the foldable strips folds when the thread is tensioned such that the distal end of each of the plurality of arms is drawn towards the center body.

20. The mechanism of claim 16, further comprising a central wall, the central wall housing the servo motor and the servo horn and comprising a thread aperture, the thread being disposed through the thread aperture such that a section of the thread defined from the thread aperture to the distal end of the thread becomes straightened.

* * * * *